April 4, 1967  E. H. GRAUEL  3,312,111
MULTIPLE-PRESSURE RESPONSIVE DEVICE
Filed Feb. 8, 1965  2 Sheets-Sheet 1

INVENTOR
Earnest H. Grauel
BY
ATTORNEYS

INVENTOR
Earnest H. Grauel
BY
ATTORNEYS

United States Patent Office 3,312,111
Patented Apr. 4, 1967

3,312,111
MULTIPLE-PRESSURE RESPONSIVE DEVICE
Ernest H. Grauel, Bridgeport, Conn., assignor to American Chain & Cable Company, Inc., New York, N.Y., a corporation of New York
Filed Feb. 8, 1965, Ser. No. 430,813
7 Claims. (Cl. 73—412)

This invention relates to devices responsive to multiple pressures, and more particularly, to a Bourdon tube device having a helicoid gear which is axially translatable and thus indirectly rotatable in response to one pressure and directly rotatable in response to another pressure.

There are many instances where it is necessary to determine the sum of or difference between two separate pressures, and to indicate that information in the manner of a gage or perhaps actuate other apparatus in response to the information. Each pressure is sensed by a curved hollow Bourdon tube having an outer end of which deflects to increase the radius of the tube under the influence of increasing pressures and decrease the radius under the influence of lessening pressures. A wide variety of linkages have been employed to translate the movement of the Bourdon tube to rotary motion of a shaft which can be used to rotate the indicator of a dial or to operate other devices directly. Where two separate Bourdon tubes are used to measure respective pressures so that their sum or difference can be determined, the common approach has been to duplicate whatever linkage is employed between each Bourdon tube and the primary shaft so that each system acts independently upon the common shaft through its own entirely separate linkage. A primary difficulty with this concept has been that considerable error is introduced in the response of the common shaft due to the cumulative effect of inaccuracies within each of the two linkages.

One principal object of the present invention is to provide a Bourdon tube device responsive to the sum of or difference between two separate pressures wherein the essential linkage components responsible for rotation of the common shaft are not duplicated but serve for both of the Bourdon tubes. By use of the device which this invention contemplates, error in the action of the common shaft may be reduced to plus and minus one-half of one percent as it rotates in either direction in reponse to changes in the sum of or difference between the two fluctuating pressures in question. One particularly appropriate use for this gage is as a flow-indicating device measuring the difference between upstream and downstream pressures across an orifice.

Broadly stated, the device responsive to multiple pressures which this invention provides comprises first and second Bourdon tubes adapted to deflect in response to respective pressures. An axially rotatable and translatable helicoid gear is included, and cam means movable along this helicoid gear in engagement therewith effect rotation thereof. First linkage means operable by the first Bourdon tube are adapted to move the cam means with respect to the helicoid gear and thus rotate the gear. Second linkage means operable by the second Bourdon tube are adapted to translate the helicoid gear axially with respect to the cam means and thus rotate the gear.

By this construction, each Bourdon tube imparts rotary motion to the gear and it is quite simple to achieve a cumulative or differential effect depending upon whether the sum of the pressures or the difference between them is to be determined. When the cam means is moved by one of the Bourdon tubes, it is the direct cause of rotation of the helicoid gear; and the other Bourdon tube can readily impart its rotation to the helicoid gear by translating it with respect to the cam means. These independent rotative influences are carried out with a minimum of deflection in the various linkage components which are involved. The helicoid gear and cam means cooperate in reflecting the movement of both Bourdon tubes and the amount of error in the system is reduced markedly over that which exists when two entirely separate linkages are actuated by the respective Bourdon tubes.

The use of a helicoid gear in cooperation with cam means is by no means new in the pressure gage industry as such, and indeed it has long been used with success in combination with a single Bourdon tube. Nor has it been unknown to combine two Bourdon tubes so that they both operate a common shaft by means of linkages other than helicoid gears and cam means. However, a single helicoid gear and cam means has never heretofore been operated by two separate Bourdon tubes as described and claimed herein so that axial translation and rotation of the helicoid gear can be used to sense respective pressures.

A preferred embodiment of this invention is decribed hereinbelow with reference to the accompanying drawings, wherein FIG. 1 is a fragmentary elevation partly in section showing a differential pressure gage embodying the invention;

Figure 2:
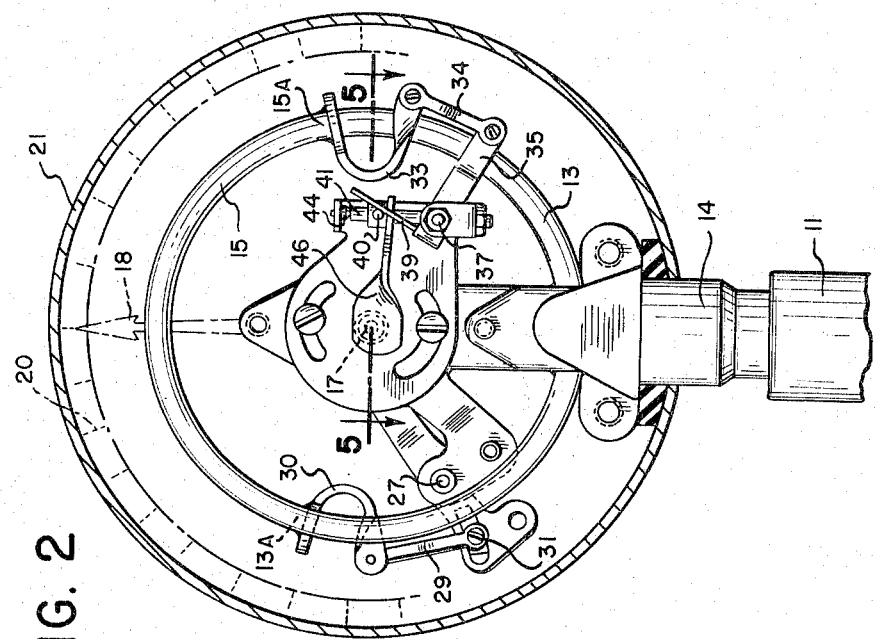
FIG. 2 is a fragmentary elevation partly in section of the opposite side of the differential pressure gage of FIG. 1.

In this embodiment of the invention conduits 10 and 11 are adapted to communicate with respective pressure sources, either or both of which may fluctuate. It is the purpose of this particular device to record by means of a dial indicator the difference between these two pressures with an accuracy of less than half of one percent. A hollow stem 12 is threaded into the conduit 10 and supports a curved Bourdon tube 13 communicating with the conduit 10. Another hollow stem 14 supports a second Bourdon tube 15 which communicates with the conduit 11. The Bourdon tubes 13 and 15 are arranged side by side in substantially parallel planes with their outer end portions 13A and 15A facing in opposite directions. As viewed in FIG. 1, increases in pressure within the conduit 10 will cause the Bourdon tube 13 to increase in radius so that its outer end portion 13A deflects in a somewhat counterclockwise direction, and decreases in pressure cause a corresponding clockwise motion. Increases in the pressure within the conduit 11 cause the other Bourdon tube 15 to increase in radius as seen in FIG. 1 so that its outer end portion 15A deflects in a generally clockwise direction, and decreases in pressure cause a corresponding counterclockwise motion.

Figure 1:
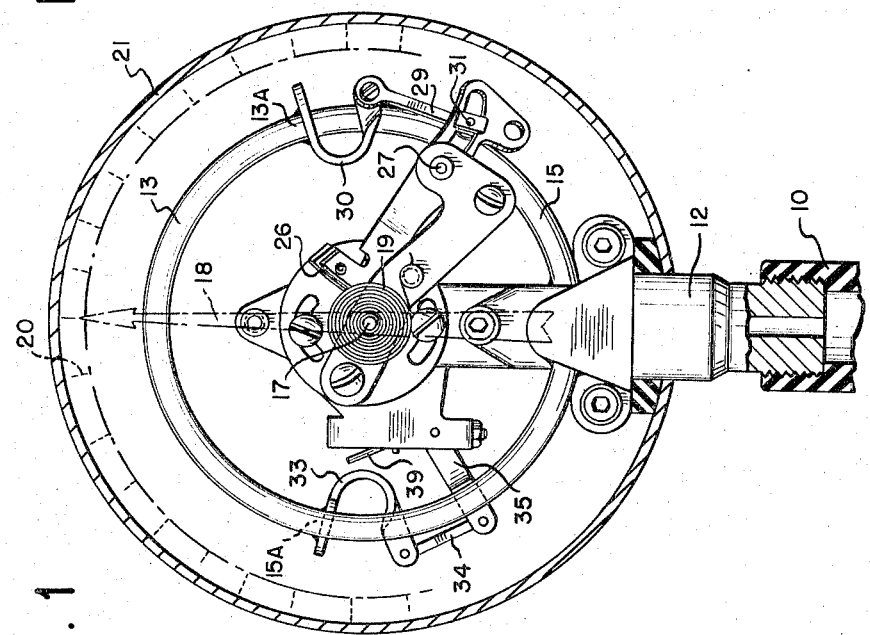
Figure 4:
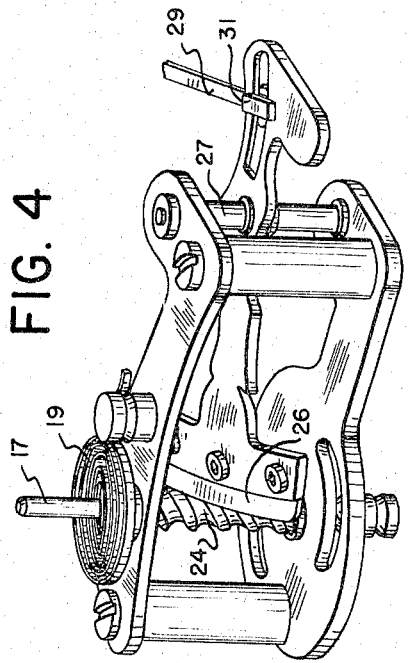
FIG. 4 is an enlarged perspective of the helicoid gear and cam means assembly used in the differential pressure gage.
Figure 5:
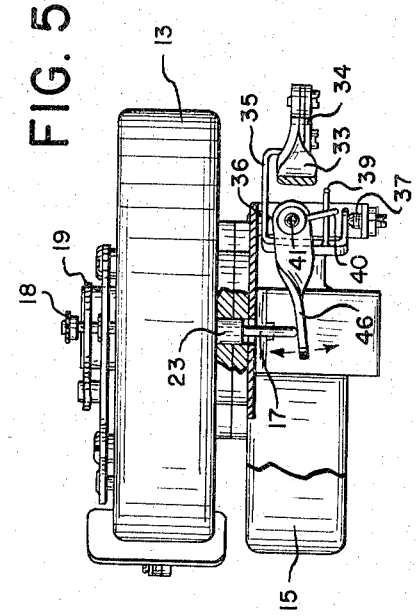
FIG. 5 is a section partly broken away taken along the line 5—5 of FIG. 2.
Figure 3:
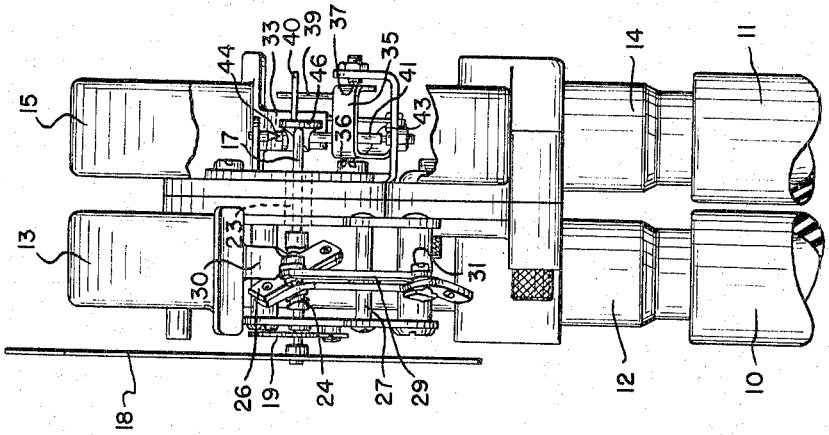
FIG. 3 is a fragmentary elevation partly broken away showing a side view of the differential pressure gage.

The Bourdon tubes 13 and 15 are disposed substantially concentrically about a central shaft 17 adapted to carry a needle indicator 18 against the force of a spring 19 around a dial face 20 within a housing 21 mounted on the stems 12 and 14. It is the purpose of this invention as applied to the differential pressure gage of this embodiment to effect rotation of the shaft 17 in one direction in response to increase in pressure within the conduit 10 and the Bourdon tube 13 and to rotate the shaft 17 in the opposite direction in response to increases in pressure within the conduit 11 and the Bourdon tube 15. Thus, from a rest position directed upwardly at "twelve o'clock,"

clockwise movement of the needle 18 as seen in FIG. 1 indicates the degree to which the pressure in the conduit 13 exceeds the pressure in the conduit 15; and counter-clockwise movement of the needle 18 from its rest position as seen in FIG. 1 indicates the degree to which the pressure in the conduit 15 exceeds the pressure in the conduit 13.

In order to permit both axial rotation and translation of the shaft 17, it is slideably and rotatably mounted in a bearing 23 mounted on the frame of the device. Also, the shaft 17 carries a concentric helicoid gear 24 which, in and of itself, is common to many single Bourdon tube pressure gages. An arcuate cam 26, pivotably mounted on a post 27, is skewed in meshing engagement across the helicoid gear 24. When the cam 26 is pivoted and the shaft 17 is held against translation, the point of engagement between the gear 24 and the cam 26 moves along and then rotates the gear and the shaft 17. Likewise, when the shaft 17 is translated and the cam 26 is held fixed, the point of engagement between the gear 24 and cam 26 again moves along the gear, and this too causes the gear and the shaft 17 to rotate. Counterclockwise pivoting of the cam 26 as shown in FIG. 1 thus causes clockwise rotation of the shaft 17, and vice versa; while translation of the shaft 17 away from the viewer in FIG. 1 causes counterclockwise rotation of the shaft 17, and vice versa. In one case the cam 26 is the action member and in the other it is the reaction member. And, of course, it is possible to pivot the cam 26 and translate the shaft 17 at the same time in any direction, and whatever rotation of the shaft 17, if any, is produced is the resolution of the contrary action and reaction effects of the cam on the helicoid gear.

First linkage means consisting of an arm 29 connects a bracket 30 on the outer end 13A of the Bourdon tube 13 to the cam 26. The movement exerted by the arm 29 on the cam 26 is adjustable by means of a slot and screw connection 31. This is a known form of helicoid gear linkage for a single Bourdon tube gage. Its function is to respond to increases in pressure within the Bourdon tube 13, which increases its radius, by pivoting the cam 26 counterclockwise as seen in FIG. 1, which in turn causes the shaft 17 and pointer 18 to rotate clockwise. Decreases in pressure in the Bourdon tube 13, which decrease its radius, cause the arm 29 to pivot the cam 26 in a clockwise direction as seen in FIG. 1, which in turn causes the shaft and pointer 18 to rotate counterclockwise.

Second linkage means connects a bracket 33 on the end 15A of the other Bourdon tube 15 to the shaft 17. This includes a first arm 34 linked to both of the bracket 33 and a second arm 35, the latter being pivoted to the frame of the gage at 36 and 37. A rod 39 affixed to the second arm 35, remote from the pivot points 36 and 37, turns with the second arm 35 to rotate another rod 40 extending from a spindle 41. The spindle 41 is also rotatably mounted at 43 and 44 to the frame of the gage. Affixed to and projecting from the spindle 41 is a third arm 46 which engages the end of the longitudinally slideable shaft 17. This second linkage means functions upon an increase in pressure within the second Bourdon tube 15 in the following manner: The Bourdon tube 15 increases in radius which moves the first arm upwardly as seen in FIG. 2 to rotate the second arm 35 in a counterclockwise direction. As a result, the rod 39 turns the spindle 41 so that the third arm 46 pushes on the end of the shaft 17. As seen in FIG. 1, this translates the shaft 17 toward the viewer and, due to the reaction of the cam 26 on the helicoid gear 24, the shaft 17 and the pointer 18 thus rotate in a counterclockwise direction. Upon a decrease in pressure within the Bourdon tube 15, its radius decreases, the first arm 34 moves downwardly as seen in FIG. 2, and the second arm 35 causes the third arm 46 to allow the shaft 17 to move longitudinally toward the viewer as seen in FIG. 1 (under the urging of the spring 17). Again, due to the reaction of the cam 26 on the gear 24, the shaft 17 and the pointer 18 thus rotate in a clockwise direction as seen in FIG. 1.

By this mechanism, the single helicoid gear 24 and cam 26 permit each of the Bourdon tubes 13 and 15 to operate the pointer 18 in either direction, and only the aforementioned first and second linkages are required as separate actuators for the respective tubes. Heretofore each tube would have had its own entirely separate pointer-operating assembly, but now no more than the minor subassemblies of the first and second linkages are unique to each. Far less black-lash and other error factors are involved in constructing two Bourdon tubes around one helicoid gear and cam assembly in their fashion and the differential pressure reading is therefore considerably more accurate. It is quite simple to convert the device so that it indicates the sum of the two pressure sources rather than their difference, for example by changing the various pivot points in the second linkage so that the third arm 46 pushes the shaft 17 forwardly when the second Bourdon tube 15 decreases, rather than increases, in radius.

I claim:

1. A device responsive to multiple pressures comprising:
   (a) first and second Bourdon tubes adapted to deflect in response to respective pressures,
   (b) an axially rotatable and translatable helicoid gear,
   (c) cam means movable along said helicoid gear in engagement therewith for affecting rotation thereof,
   (d) first linkage means operable by the first Bourdon tube for moving the cam means with respect to the helicoid gear and thus rotating the gear, and
   (e) second linkage means operable by the second Bourdon tube for axially translating the helicoid gear with respect to the cam means and thus rotating the gear.

2. A device responsive to multiple pressures comprising:
   (a) first and second Bourdon tubes having respective outer end portions adapted to deflect in response to changes in respective first and second pressures,
   (b) an axially rotatable and translatable shaft,
   (c) a helicoid gear fixed concentrically about said shaft,
   (d) pivotable arcuate cam means skewed in meshing engagement across said helicoid gear with its point of engagement therewith movable along the gear to rotate the shaft when the cam means is pivoted,
   (e) first linkage means connecting the outer end portion of the first Bourdon tube with the cam means for pivoting the cam means and thus rotating the shaft in response to changes in the first pressure, and
   (f) second linkage means connecting the outer end portion of the second Bourdon tube with the shaft for axially translating the helicoid gear with respect to the cam means and thus rotating the shaft in response to changes in the second pressure.

3. A device according to claim 2 wherein the first and second Bourdon tubes are disposed in substantially parallel planes and curve substantially concentrically about the shaft with their respective outer end portions facing in opposite directions.

4. A device responsive to differential pressures comprising:
   (a) first and second Bourdon tubes adapted to deflect in response to changes in respective first and second pressures,
   (b) an axially rotatable and translatable helicoid gear,
   (c) cam means movable along said helicoid gear in engagement therewith for effecting rotation thereof,
   (d) first linkage means operable by the first Bourdon tube for moving the cam means with respect to the helicoid gear and thus rotating the gear in one direction in response to increases in the first pressure and in the opposite direction in response to decreases in the first pressure, and (e) second linkage means operable by the second Bourdon tube, for axially translating the helicoid gear with respect to the cam means and thus rotating the gear in the first-mentioned direction in response to decreases in the second pressure and in said opposite direction in response to increases in the second pressure.

5. A device responsive to differential pressures comprising:
 (a) first and second Bourdon tubes having respective outer end portions adapted to deflect in opposite directions in response to increases and decreases in respective first and second pressures,
 (b) an axially rotatable and translatable shaft,
 (c) a helicoid gear fixed concentrically about said shaft,
 (d) pivotable arcuate cam means skewed in meshing engagement across said helicoid gear with its point of engagement therewith movable along the gear to rotate the shaft when the cam means is pivoted,
 (e) first linkage means connecting the outer end of the first Bourdon tube with the cam means for pivoting the cam means and thus rotating the shaft in one direction in response to increases in the first pressure and in the opposite direction in response to decreases in the first pressure, and
 (f) second linkage means connecting the outer end portion of the second Bourdon tube with the shaft for axially translating the helicoid gear with respect to the cam means and thus rotating the shaft in the first-mentioned direction in response to decreases in the second pressure and in said opposite direction in response to increases in the second pressure.

6. A device according to claim 5 wherein the first and second Bourdon tubes are disposed in substantially parallel planes and curve concentrically about the shaft with their respective outer end portions facing in opposite directions.

7. A device according to claim 5 which is a gage for measuring the difference between the first and second pressures, said device including a dial indicator mounted on the end of the shaft and rotatable therewith.

References Cited by the Examiner

UNITED STATES PATENTS 2,862,388   12/1958   Grant _____ 73—412

LOUIS R. PRINCE, *Primary Examiner.*

D. O. WOODIEL, *Assistant Examiner.*